United States Patent [19]

Yamamoto et al.

[11] Patent Number: 4,935,983
[45] Date of Patent: Jun. 26, 1990

[54] WINDSHIELD WIPER SYSTEM

[75] Inventors: Takeshi Yamamoto; Takeshi Konishi; Shosuke Nomura; Susumu Okazaki; Shinshi Kajimoto, all of Hiroshima, Japan

[73] Assignee: Mazda Motor Corporation, Hiroshima, Japan

[21] Appl. No.: 216,179

[22] Filed: Jul. 7, 1988

[30] Foreign Application Priority Data

Jul. 8, 1987 [JP] Japan .................................. 62-170479
Jul. 8, 1987 [JP] Japan .................................. 62-170480

[51] Int. Cl.$^5$ .............................................. B60S 1/32
[52] U.S. Cl. .................................. 15/250.16; 15/250.19; 15/250.23; 15/250.31; 15/250.34; 15/250.35
[58] Field of Search ............ 15/250.16, 250.17, 250.19, 15/250.23, 250.34, 250.35, 250.31

[56] References Cited

U.S. PATENT DOCUMENTS 2,740,152  4/1956  Mosher ............................. 15/250.35
3,694,846 10/1972  Parker ............................. 15/250.16
4,285,540  8/1981  Harada et al. ................. 15/250.16 X

FOREIGN PATENT DOCUMENTS 60-125261 8/1985 Japan .
50854 3/1986 Japan .................................. 15/250.19

Primary Examiner—Harvey C. Hornsby
Assistant Examiner—M. Spisich
Attorney, Agent, or Firm—Sixbey, Friedman, Leedom & Ferguson

[57] ABSTRACT

A windshield wiper system for a vehicle has a wiper arm and a wiper blade connected to one end of the wiper arm. The wiper arm is mounted on a wiper pivot mounted on the vehicle body near an edge of the windshield of the vehicle and adapted to be pivoted back and forth about the wiper pivot between a first position and a second position to swing the wiper blade between a first reverse position and a second reverse position on the windshield when wiping the windshield. The wiper arm is arranged to be further pivoted to swing the wiper blade beyond the first reverse position to a concealed position below the windshield and to be held there. The wiper arm has a first arm portion connected to the wiper pivot at one end, a second arm portion connected to the wiper blade at one end and to the other end of the first arm portion at the other end by way of a joint which permits change in the angle between the first and second arm portions, and a spring which urges the first and second arm portions into a predetermined angular relationship. A stopper member is provided on the vehicle body to abut against the second arm portion to prevent the second arm portion from following the first arm portion when the wiper arm is pivoted beyond the position corresponding to the concealed position of the wiper blade, thereby changing the angle between the first and second arm portions overcoming the force of the spring.

10 Claims, 10 Drawing Sheets

FIG.11
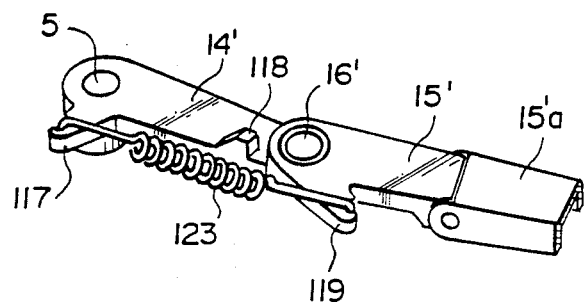
FIG.12
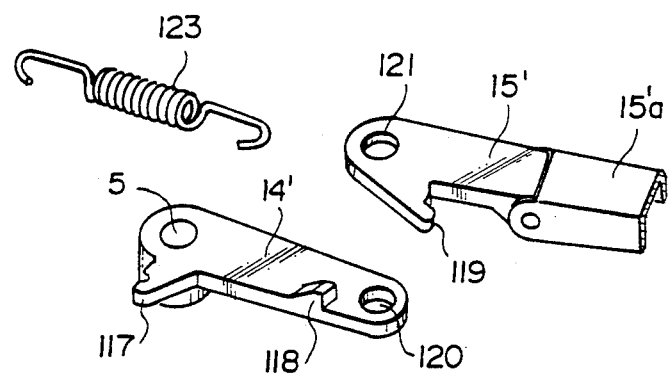
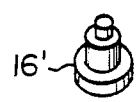

WINDSHIELD WIPER SYSTEM

BACKGROUND OF THE INVENTION

1. Field of the Invention

This invention relates to a windshield wiper system for a vehicle.

2. Description of the Prior Art

There has been known a windshield wiper system having a wiper arm which is pivoted about a wiper pivot mounted on the vehicle body below the windshield. See Japanese Unexamined Utility Model Publication No. 60(1985)-125261, for instance. When such a wiper system is applied as a concealed wiper, there arise difficulties as follows. That is, in the concealed wiper system, the wiper arm is pivoted back and forth to swing the wiper blade between a first reverse position near the lower edge of the windshield and a second reverse position remote from the same when the wiper switch is turned on, and the wiper arm is further pivoted to swing the wiper blade beyond the first reverse position to a concealed position below the windshield when the wiper switch is turned off. The wiper arm is normally positioned to hold the wiper blade in the concealed position. Generally an air intake portion for an air conditioner is located below the windshield, and when the wiper arm and the wiper blade is arranged not to interfere with the air intake portion when the wiper blade is in the concealed position as shown by the solid line in FIG. 14 where the wiper pivot, the wiper arm, the wiper blade and the air intake portion are respectively indicated at 71, 72, 73 and 74 and the windshield is indicated at W, the portion of the windshield W indicated at $\beta$, that is, the portion between the wiper blade shown by the chain line and the lower edge of the windshield, cannot be wiped. On the other hand, when the wiper arm 72 and the wiper blade 73 are arranged so that the windshield W can be wiped up to the lower edge thereof as shown by the chain line in FIG. 15, the wiper blade 73 will interfere with the air intake portion 74 when it is in the concealed position as shown by the solid line in FIG. 15. In FIGS. 14 and 15, the first reverse position of the wiper blade 73 is shown by the chain line.

SUMMARY OF THE INVENTION

In view of the foregoing observations and description, the primary object of the present invention is to provide a concealed type windshield wiper system in which interference of the wiper arm or wiper blade with a part of the vehicle near the concealed position of the wiper blade, e.g. an air intake portion of the air conditioner, can be prevented without sacrificing the wiping area.

In accordance with the present invention, there is provided a windshield wiper system for a vehicle comprising a wiper arm and a wiper blade connected to one end of the wiper arm, the wiper arm being mounted on a wiper pivot mounted on the vehicle body near an edge of the windshield of the vehicle and adapted to be pivoted back and forth about the wiper pivot between a first position and a second position to swing the wiper blade between a first reverse position and a second reverse position on the windshield when wiping the windshield, and the wiper arm being arranged to be further pivoted to swing the wiper blade beyond the first reverse position to a concealed position below the windshield and to be held there, characterized in that said wiper arm comprises a first arm portion connected to the wiper pivot at one end, a second arm portion connected to the wiper blade at one end and to the other end of the first arm portion at the other end by way of a joint means which permits change in the angle between the first and second arm portions, and an urging means which urges the first and second arm portions into a predetermined angular relationship, and a stopper member is provided on the vehicle body to abut against the second arm portion to prevent the second arm portion from following the first arm portion when the wiper arm is pivoted beyond the position corresponding to the concealed position of the wiper blade, thereby changing the angle between the first and second arm portions overcoming the force of the urging means.

In accordance with an embodiment of the present invention, the angular relationship between the second arm portion and the wiper blade is set so that the wiper blade extends substantially along the lower edge of the windshield when it is in the first reverse position while the urging means is arranged to urge the first and second arm portions to be in line with each other, and when the wiper blade is brought to the concealed position the stopper member limits swing of the wiper blade not to interfere with a part of the vehicle near the concealed position such as the air intake portion of the air conditioner while bending the wiper arm at the joint means overcoming the force of the urging means.

In accordance with another embodiment of the present invention, the urging means urges the first and second arm portions to be in such an angular relationship as to cause the wiper blade to extend substantially along the lower edge of the windshield when it is in the first reverse position and when the wiper blade is brought to the concealed position the stopper member limits swing of the wiper blade not to interfere with a part of the vehicle near the concealed position such as the air intake portion of the air conditioner while bringing the first and second arm portions into line overcoming the force of the urging means.

BRIEF DESCRIPTION OF THE DRAWINGS

FIG. 11 is a perspective view showing a part of the wiper arm employed in the embodiment shown in FIG. 10, FIG. 12 is an exploded perspective view of the part of the wiper arm.

DESCRIPTION OF THE PREFERRED EMBODIMENTS

Figure 1:
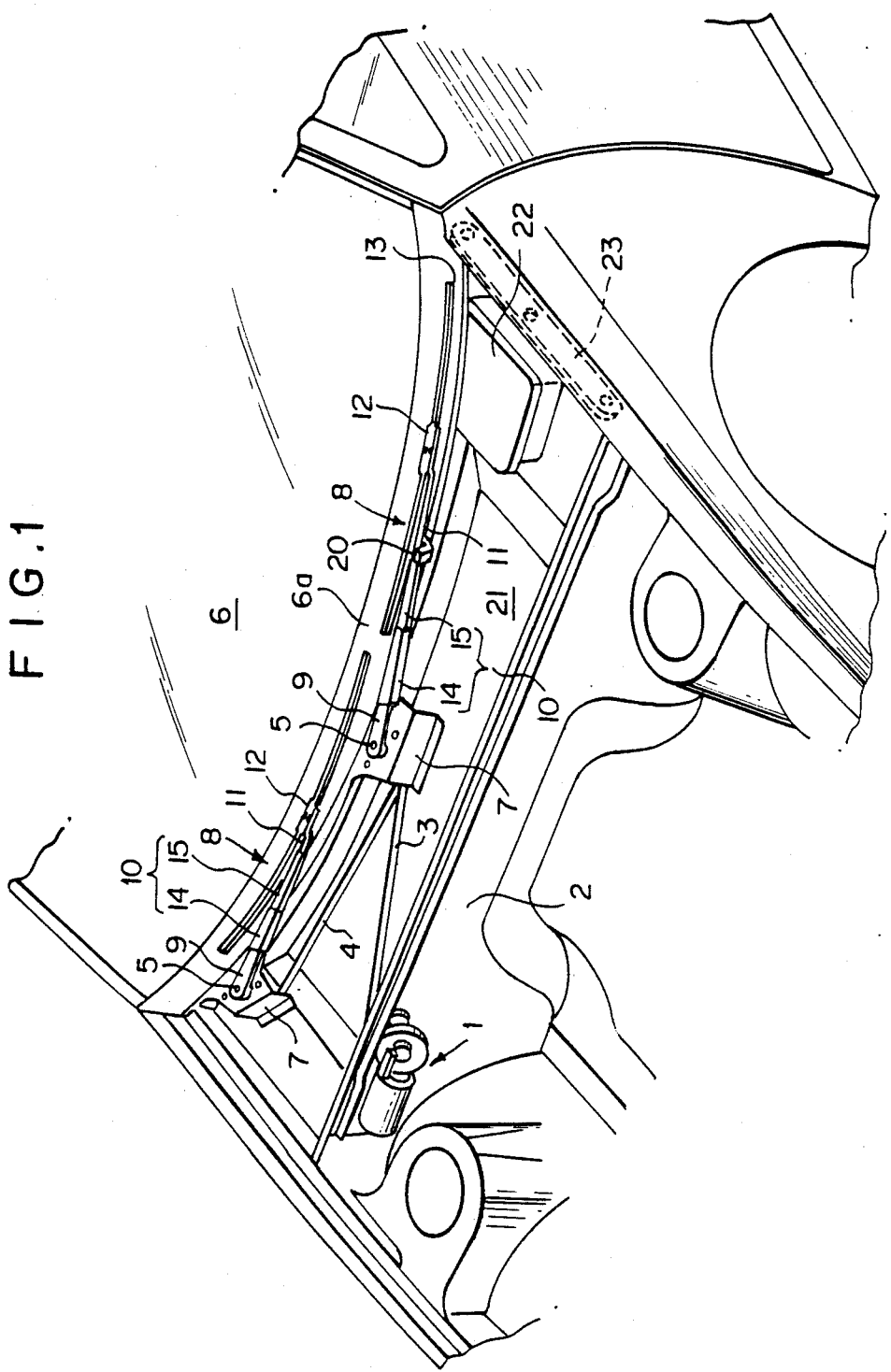
FIG. 1 is a schematic perspective view of a windshield wiper system in accordance with an embodiment of the present invention.

In FIG. 1, a wiper driving system 1 comprising a wiper motor, a worm, a worm wheel and a link which are not shown is mounted on a dashboard lower panel 2.

A pair of wiper pivots 5 driven by the wiper driving system 1 by way of link rods 3 and 4 are respectively mounted on a pair of brackets 7 provided under a windshield molding panel 6a for supporting the lower edge of a windshield 6. Right and left windshield wipers 8 are respectively connected to the wiper pivots 5 to be pivoted back and forth about the wiper pivots 5.

Figure 3:
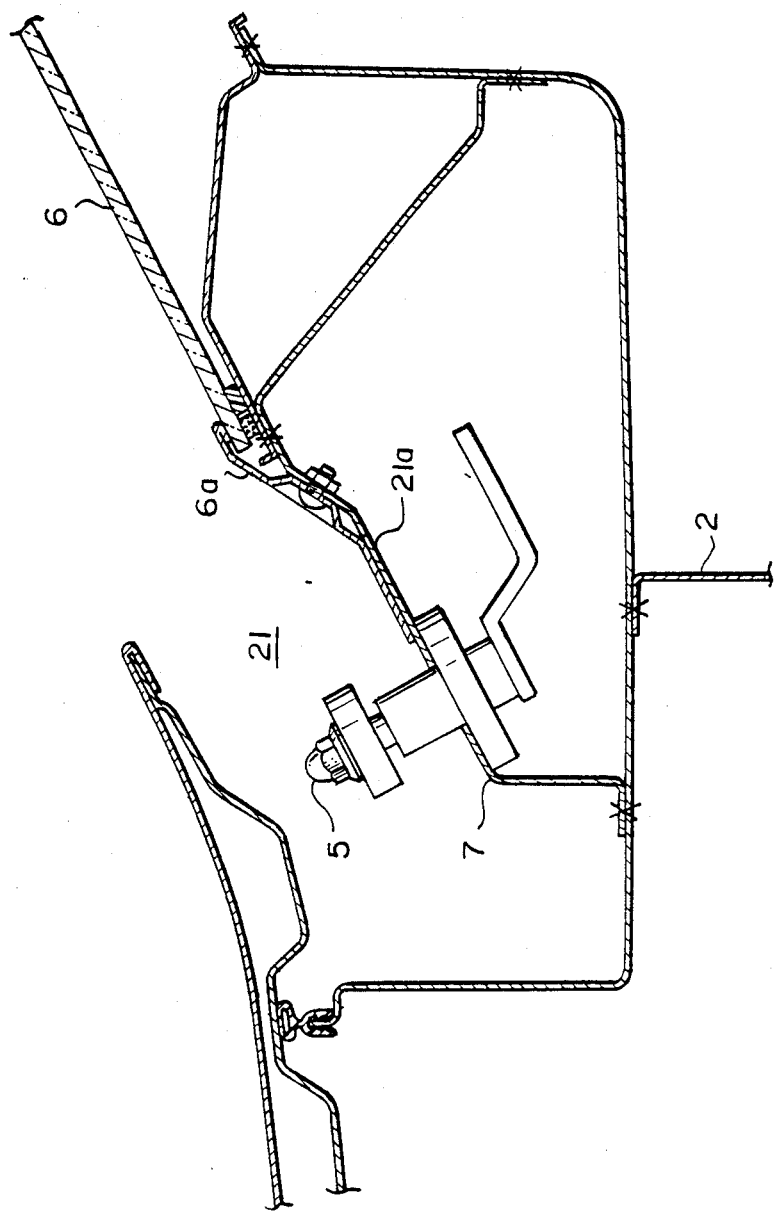
FIGS. 3 to 5 are cross-sectional views respectively taken along lines III—III, IV—IV and V—V in FIG. 2.
Figure 4:
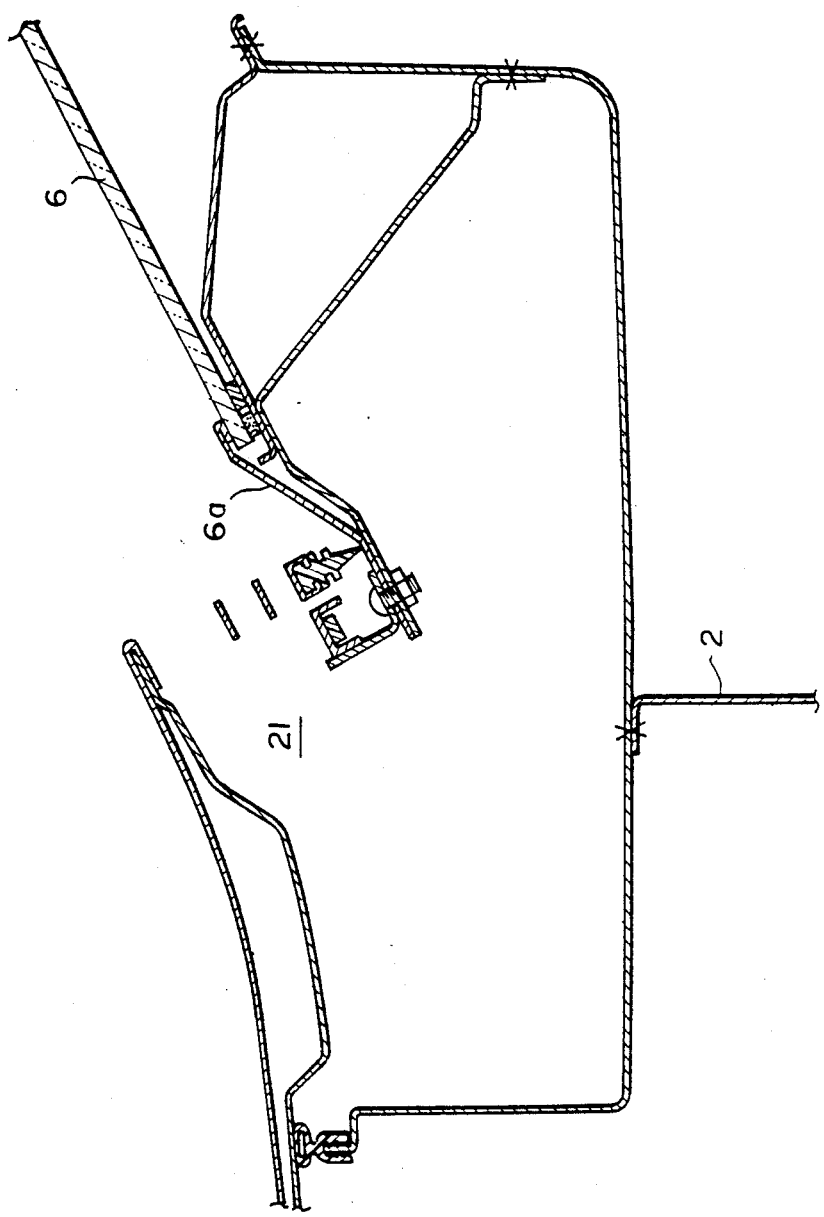
Figure 5:
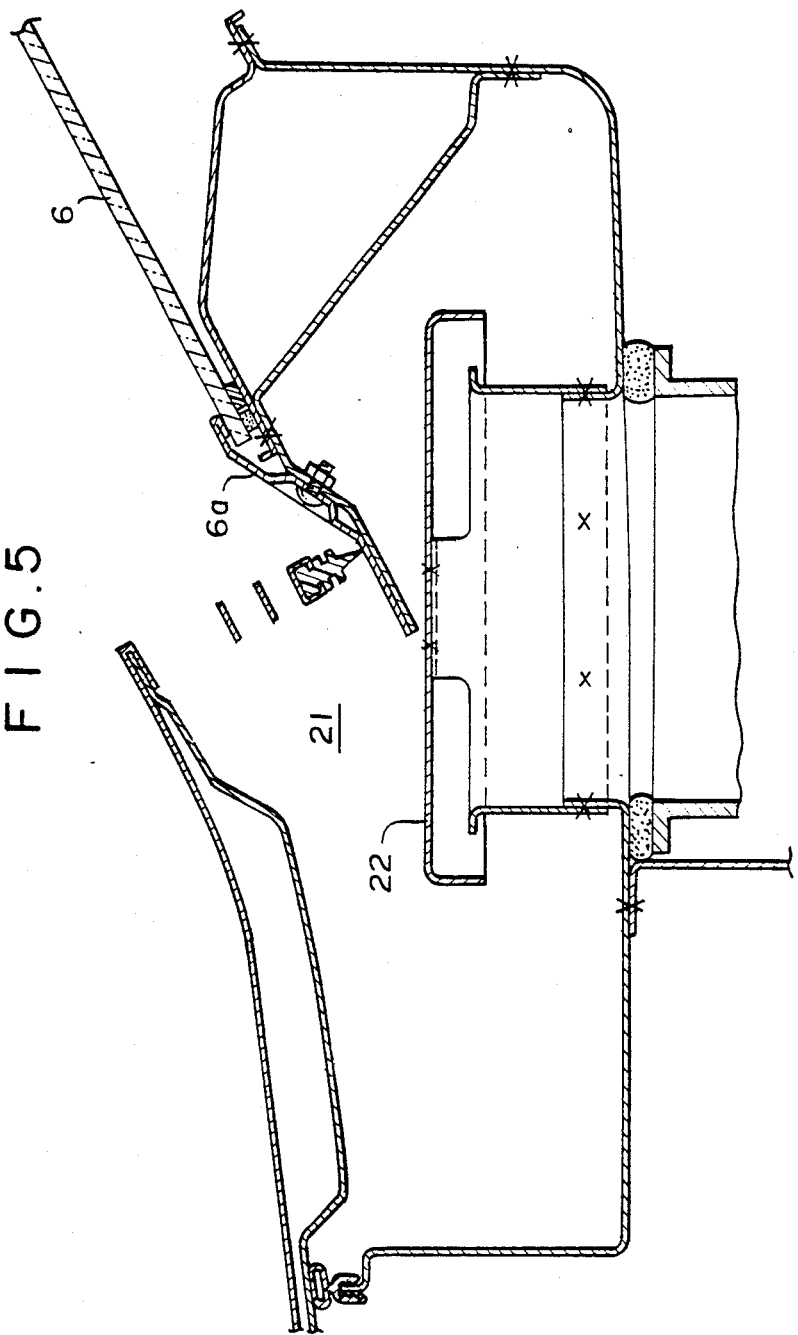
Figure 6:
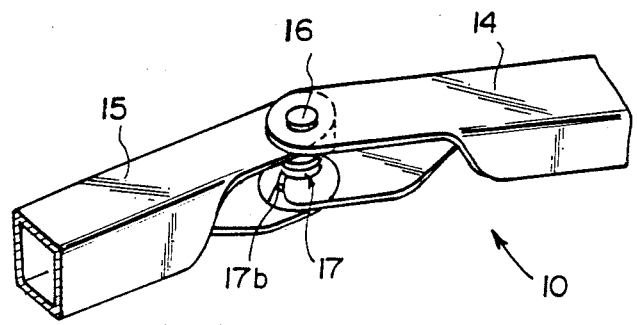
FIG. 6 is a perspective view showing a part of the wiper arm employed in the windshield wiper system.
Figure 7:
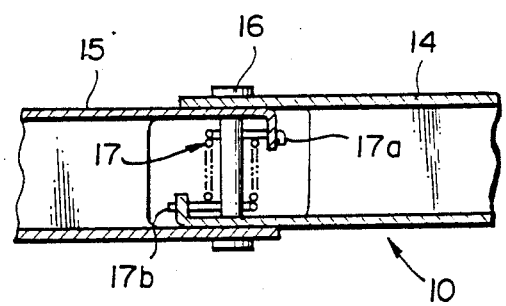
FIG. 7 is a cross-sectional view of the part of the wiper arm.
Figure 8:
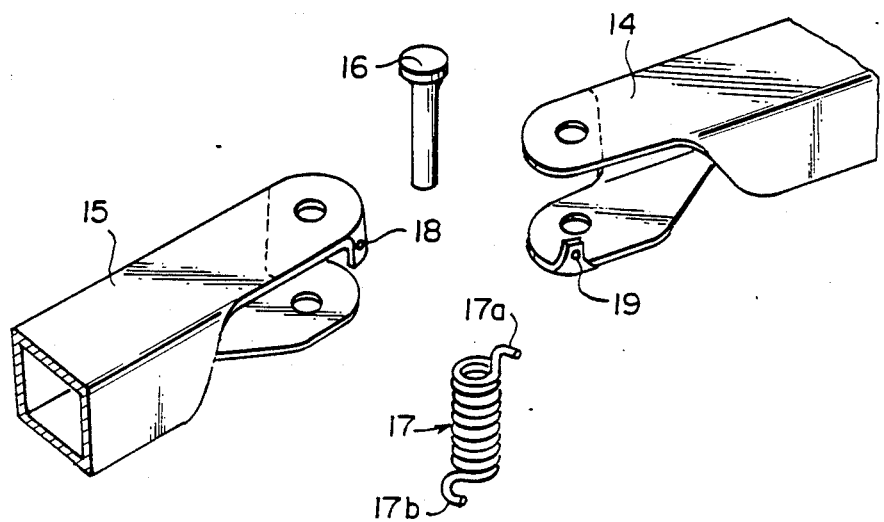
FIG. 8 is an exploded perspective view of the part of the wiper arm.

A cowl box 21 is disposed on the dashboard lower panel 2 to extend in the transverse direction of the vehicle body. As clearly shown in FIGS. 3 to 5, the cowl box 21 is open upward and is connected to right and left walls of the engine room at the respective ends thereof. The lower edge of the windshield 6 rests on the upper surface of the rear side portion of the cowl box 21. The windshield molding panel 6a is fixed to the upper surface of a cowl panel 21a defining the cowl box 21, and the brackets 7 are formed integrally with the cowl panel 21a. The lower end of each bracket 7 is fixed to the bottom of the cowl box 21.

Since the right and left wipers 8 are the same in the structure, only one of them will be described hereinbelow.

Figure 2:
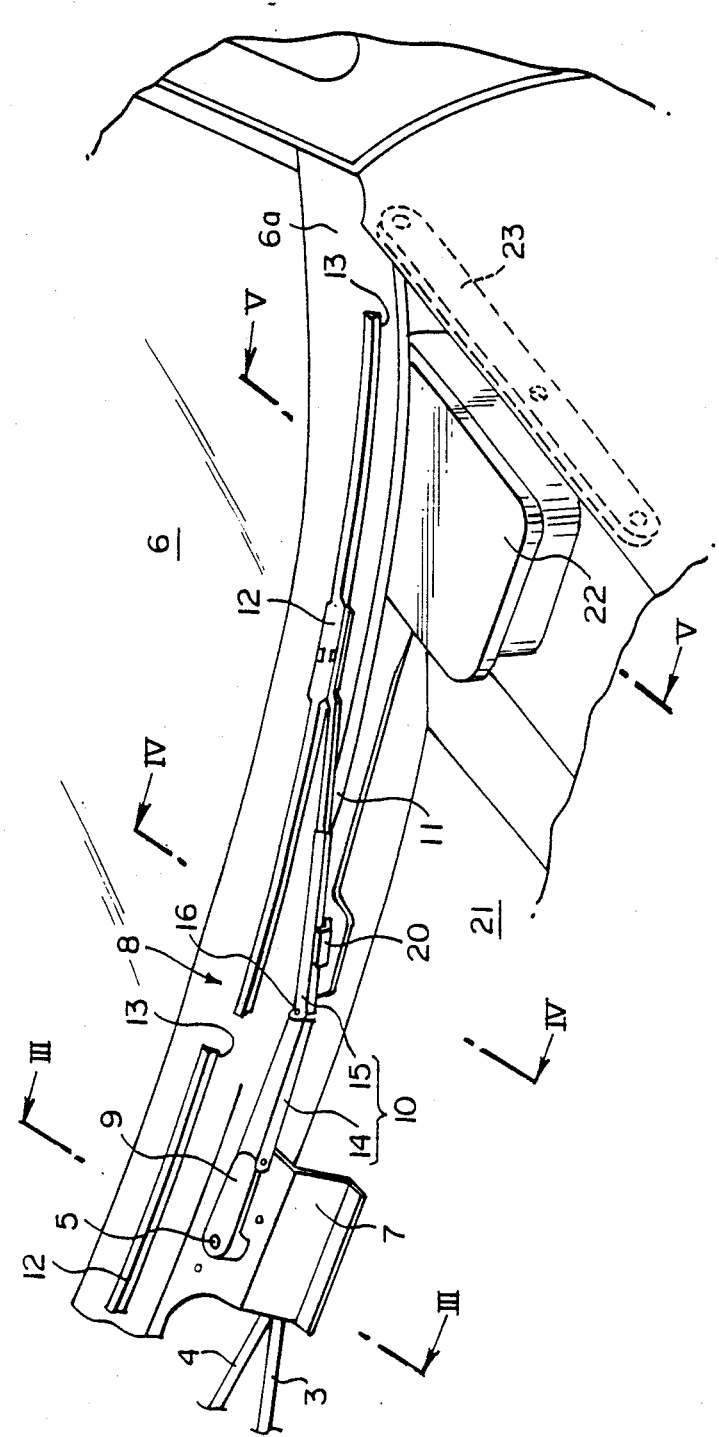
FIG. 2 is a fragmentary enlarged view showing a part of the windshield wiper system.

As shown in FIG. 2, the wiper 8 comprises a wiper arm 10 connected to the wiper pivot 5 at one end by way of an arm head 9, a wiper blade 12 connected to the other end of the wiper arm 10 by way of an arm piece 11, and a blade rubber 13 attached to the wiper blade 12.

As shown in FIGS. 2 and 6 to 8, the wiper arm 10 comprises a first arm portion 14 and a second arm portion 15 which are connected together at respective one ends by way of a caulked pin 16 to be bendable about the pin 16, and are connected to the wiper pivot 5 and the wiper blade 12 at respective the other ends. A coil spring 17 is fitted on the caulked pin 16 with one end 17a in engagement with an engaging hole 18 formed in the second arm portion 15 and the other end 17b in engagement with an engaging hole 19 formed in the first arm portion 14. The spring rate of the coil spring 17 is selected so that the wiper arm 10 is kept straight under load lighter than a predetermined value.

The wiper system of this embodiment is a so-called rise-up type wiper system in which the wiper blade 12 is normally positioned in a concealed position below the lower edge of the windshield 6 and is swung back and forth between a first reverse position near the lower edge of the windshield 6 and a second reverse position remote from the same to wipe the windshield 6 when the wiper switch (not shown) is turned on. The wiper blade 12 is fixed to the second arm portion 15 to extend along the lower edge of the windshield 6 when it is in the first reverse position with the first and second arm portions 14 and 15 kept in line with each other as shown by the chain line in FIG. 9.

Figure 9:
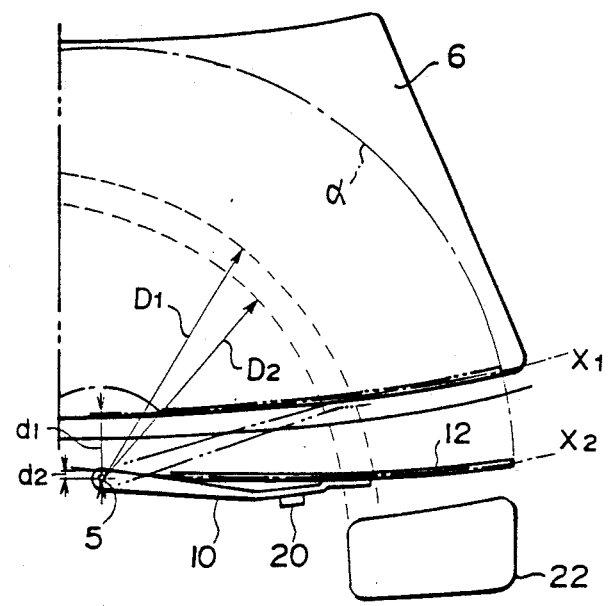
FIG. 9 is a schematic view for illustrating the operation of the windshield wiper system.

As shown in FIGS. 1, 2 and 9, a stopper member 20 is provided to limit swing of the second arm portion 15 beyond the first reverse position, thereby defining the concealed position of the wiper blade 12. Accordingly, when the wiper blade 12 is brought to the concealed position, the second arm portion 15 comes to be at an angle to the first arm portion 14, that is, the wiper arm 10 is bent at the pin 16 overcoming the force of the spring 17 as shown by the solid line in FIG. 9. The stopper member 20 is made of rubber and mounted on the windshield molding panel 6a above an air intake portion 22 for an air conditioner (not shown) formed at one end of the cowl box 21, thereby preventing the wiper blade 12 from interfering with the air intake portion 22.

As can be understood from the description above, in the wiper system of this embodiment, the windshield 6 can be wiped up to the lower edge thereof as shown by line α in FIG. 9 without giving rise to the problem that the wiper blade 12 interferes, when it is brought to the concealed position, with a part of the vehicle which is the air intake portion 22 for the air conditioner in this particular embodiment.

Though, in the embodiment described above, the angular relationship between the second arm portion 15 and the wiper blade 12 is selected so that the wiper blade 12 extends along the lower edge of the windshield 6 when it is in the first reverse position with the first and second arm portions 14 and 15 being in line with each other, the wiper blade 12 is arranged to extend along the lower edge of the windshield 6 when it is in the first reverse position by adjusting the angular relationship between the first and second arm portions 14 and 15 in the embodiment shown in FIGS. 10 to 13. The embodiment shown in FIGS. 10 to 13 is substantially the same as the embodiment shown in FIGS. 1 to 9 except the structure of the wiper arm 10, and accordingly, the parts analogous to the parts shown in FIGS. 1 to 9 are given the same reference numerals in FIGS. 10 to 13 and will not be described here.

In this embodiment, the first arm portion 14' has a spring retainer portion 117 and a projection 118 formed integrally therewith, and the second arm portion 15' connected to the first arm portion 14' by way of a caulked pin 16' has a spring retainer portion 119 formed integrally therewith as shown in FIGS. 11 and 12. The caulked pin 16' is inserted into bores 120 and 121 formed in the first and second arm portions 14' and 15', and the top portion of the pin 16' is caulked after a washer 122 is fitted thereon. Thus, the first and second arm portions 14' and 15' are connected to be bendable about the caulked pin 16' relative to each other. Reference numeral 15'a denotes a retainer integrally fixed to the second arm portion 15'. A spring 123 connected to the spring retainer portions 117 and 119 at respective ends normally urges the second arm portion 15' to be at an angle relative to the first arm portion 14' where the spring retainer portion 19' of the second arm portion 15' abuts against the projection 118 on the first arm portion 14'.

Figure 13:
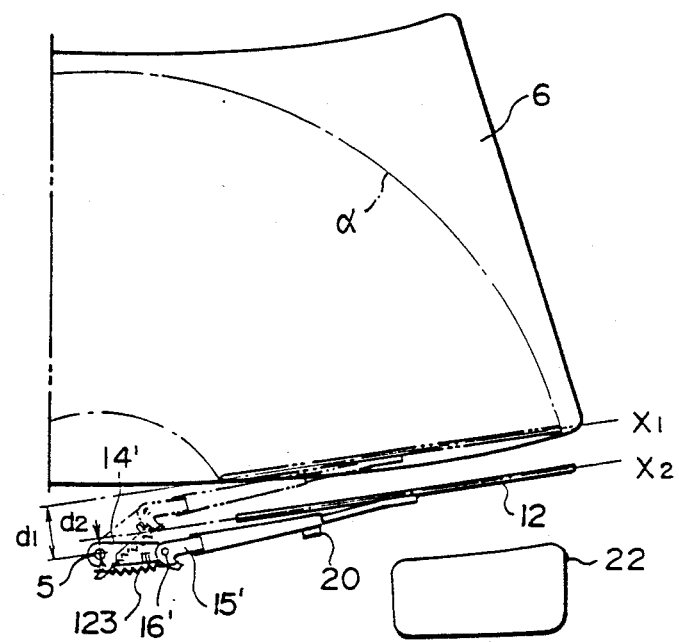
FIG. 13 is a schematic view for illustrating the operation of the windshield wiper system shown in FIG. 10, and FIGS. 14 and 15 are views for illustrating problems inherent to the conventional wiper system.
Figure 10:
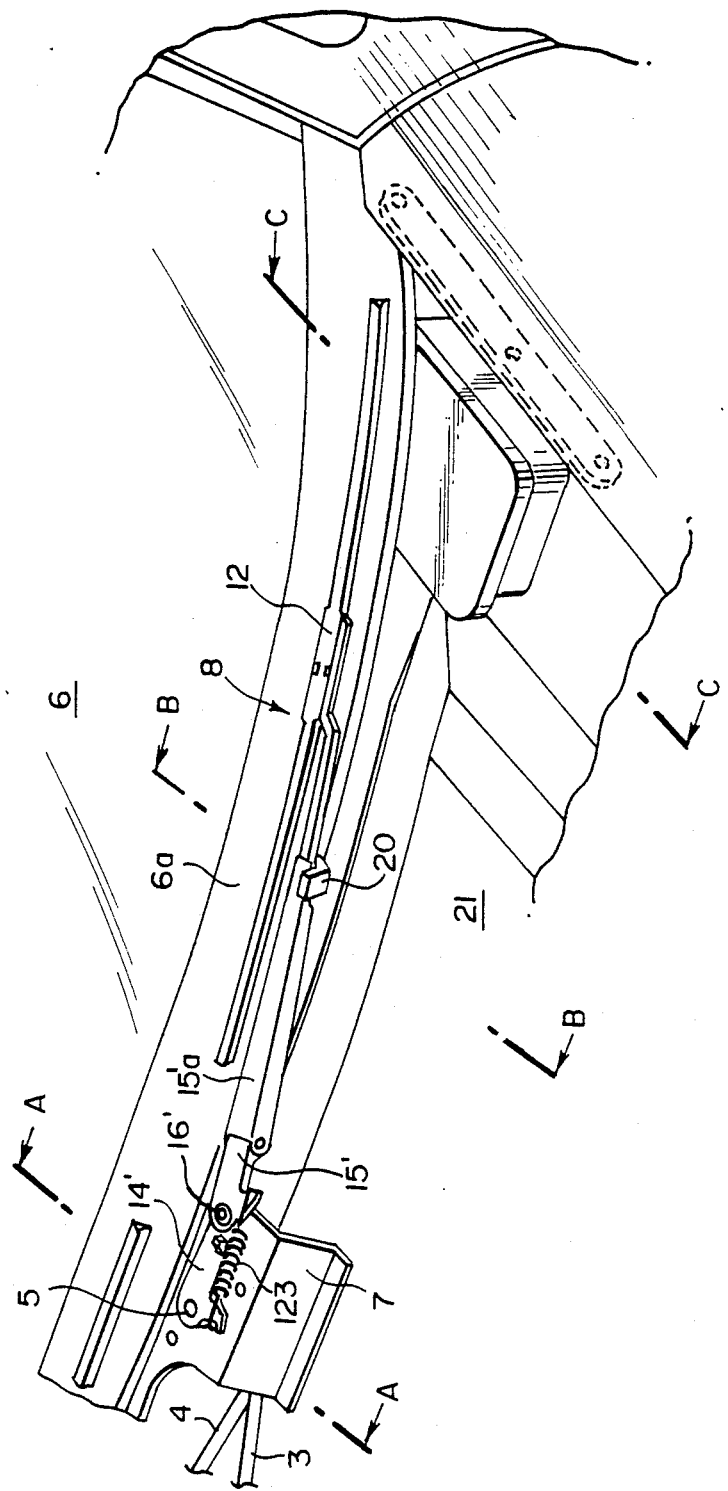
FIG. 10 is a view similar to FIG. 2 but showing another embodiment of the present invention.
Figure 14:
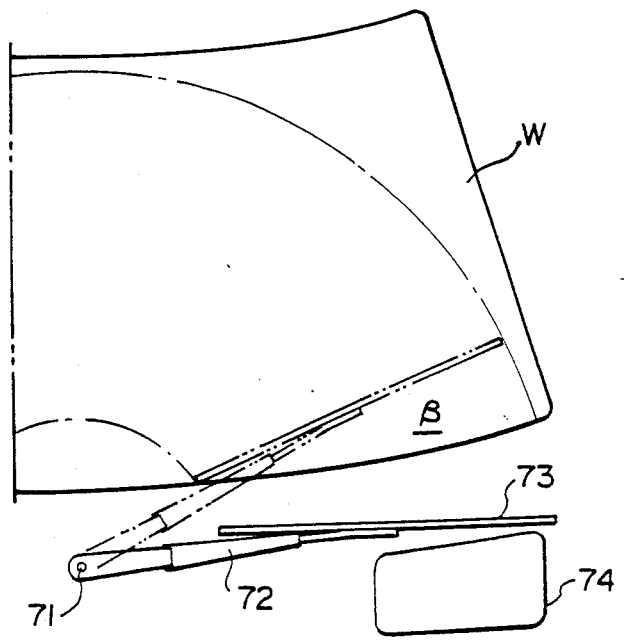
Figure 15:
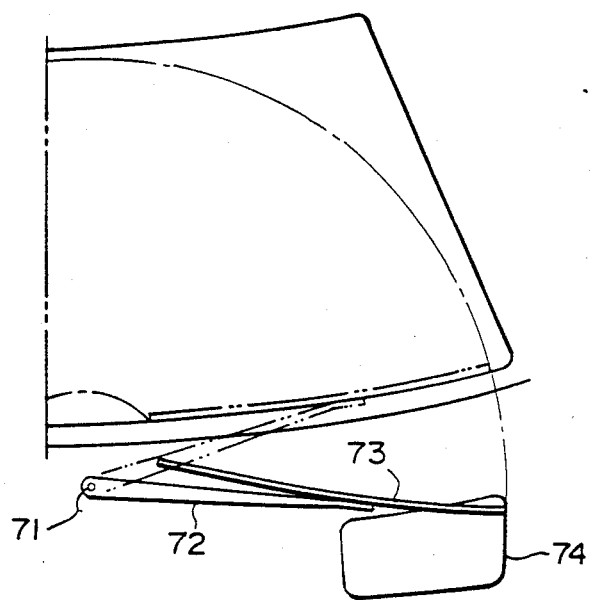

When wiping the windshield 6, the wiper arm 8 is in bent state as shown by the chain line in FIG. 13 and the windshield 6 can be wiped up to the lower edge thereof as shown by line α. When the wiper arm 8 is pivoted to swing the wiper blade 12 to the concealed position, the stopper member 20 limits the swing of the second arm portion 15' overcoming the force of the spring 123 with the first and second arm portions 14' and 15' being brought into line, thereby preventing the wiper blade 12 from interfering with the air intake portion 22.

In both the embodiments described above, the distance d2 between the wiper pivot 5 and the wiper blade 12 as measured in perpendicular to the longitudinal axis (X2) of the wiper blade when the wiper blade 12 is in the concealed position is smaller than the distance d1 between the wiper pivot 5 and the wiper blade 12 as measured in perpendicular to the longitudinal axis (X1) of the wiper blade when the wiper blade 12 is in the first reverse position as can be seen from FIGS. 9 and 13. This contributes to reduction of the width of the space in the cowl box 21 occupied by the wiper arm 8 and the wiper blade 12 when the wiper blade 12 is concealed.

Further, in the former embodiment, the distance D2 between the wiper pivot 5 and the junction of the wiper blade 12 to the wiper arm 8 when the wiper blade 12 is in the concealed position is smaller than that D1 when the wiper blade 12 is in the first reverse position. That is, the overall length of the wiper, the length from the wiper pivot 5 to the distal end of the wiper blade 12 is reduced when the wiper blade 12 is brought to the concealed position as can be understood from FIG. 9. This contributes to reduction of the overall length of the space in the cowl box 21 occupied by the wiper arm 8 and the wiper blade 12. For example, the wiper blade 12 can be prevented from interfering with a hood hinge 23 (FIG. 2) which is disposed at a larger distance from the wiper pivot 5 than the air intake portion 22 and projects above the same.

We claim:

1. A windshield wiper system for a vehicle comprising a wiper arm and a wiper blade connected to one end of the wiper arm, the wiper arm being mounted on a wiper pivot mounted on the vehicle body near an edge of the windshield of the vehicle and adapted to be pivoted back and forth about the wiper pivot between a first position and a second position to swing the wiper blade between a first reverse position and a second reverse position on the windshield when wiping the windshield, and the wiper arm being arranged to be further pivoted to swing the wiper blade beyond the first reverse position to a concealed position below the windshield and to be held there, characterized in that said wiper arm comprises a first arm portion connected to the wiper pivot at one end, a second arm portion connected to the wiper blade at one end and to the other end of the first arm portion at the other end by way of a joint means which permits change in the angle between the first and second arm portions, and an urging means which urges the first and second arm portions into a predetermined angular relationship, and a stopper member is provided on the vehicle body to abut against the second arm portion to prevent the second arm portion from following the first arm portion when the wiper arm is pivoted beyond the position corresponding to the concealed position of the wiper blade, thereby changing the angle between the first and second arm portions overcoming the force of the urging means.

2. A windshield wiper system as defined in claim 1 in which said urging means urges the first and second arm portions to be at an angle to each other when load on the second arm portion is lighter than a predetermined value.

3. A windshield wiper system as defined in claim 2 in which the angle between the first and second arm portions is selected so that the wiper blade extends substantially along the lower edge of the windshield when it is in the first reverse position.

4. A windshield wiper system as defined in claim 1 in which said urging means urges the first and second arm portions to be in line with each other when load on the second arm portion is lighter than a predetermined value.

5. A windshield wiper system as defined in claim 4 in which said wiper blade is connected to the second arm portion to extend substantially along the lower edge of the windshield when it is in the first reverse position.

6. A windshield wiper system as defined in claim 1 in which said second arm portion is pivoted on the first arm portion, and the first and second arm portions are respectively provided with engaging portions for mounting the urging means.

7. A windshield wiper system as defined in claim 1 in which the lower edge of said windshield rests on a rear part of the top of a cowl box provided above the dashboard lower panel which separates the engine room from the passenger compartment of the vehicle, the cowl box extending in the transverse direction of the vehicle and connected to the side walls of the engine room at respective ends, and said wiper pivot is mounted on the cowl box, said first reverse position and the concealed position of the wiper blade being near the lower edge of the windshield.

8. A windshield wiper system as defined in claim 7 in which said cowl box is open upward and an air intake portion for an air conditioner is provided in the cowl box near the concealed position of the wiper blade.

9. A windshield wiper system as defined in claim 8 in which said wiper pivot is driven by way of a link mechanism by a wiper driving means mounted on the dashboard lower panel, and is mounted on a bracket fixed to the cowl box near a windshield molding panel which covers the lower edge portion of the windshield, the wiper pivot being disposed substantially at the middle between the left and right sides of the vehicle.

10. A windshield wiper system as defined in claim 7 in which a hood hinge is disposed near the concealed position of the wiper blade.

* * * * *